(12) United States Patent
Chang

(10) Patent No.: US 6,765,811 B1
(45) Date of Patent: Jul. 20, 2004

(54) METHOD IN THE DESIGN FOR A POWER SUPPLY FOR SUPPRESSING NOISE AND SIGNAL INTERFERENCE IN EQUIPMENT

(75) Inventor: Chung-Hsing Chang, Taoyuan Hsien (TW)

(73) Assignee: Arima Computer Corporation, Taipei (TW)

( * ) Notice: Subject to any disclaimer, the term of this patent is extended or adjusted under 35 U.S.C. 154(b) by 0 days.

(21) Appl. No.: 10/463,089

(22) Filed: Jun. 17, 2003

(51) Int. Cl.[7] .............................................. H02M 1/12
(52) U.S. Cl. ........................................ 363/39; 363/47
(58) Field of Search .............................. 363/16, 21.01, 363/39, 40, 44, 45, 46, 47; 333/12

(56) References Cited

U.S. PATENT DOCUMENTS 3,731,234 A * 5/1973 Collins ..................... 333/12 X
5,847,941 A * 12/1998 Taguchi et al. .......... 363/21.03
6,469,913 B2 * 10/2002 Hosotani et al. .............. 363/16

* cited by examiner

Primary Examiner—Jessica Han
(74) Attorney, Agent, or Firm—Timothy J. Keefer; Seyfarth Shaw LLP

(57) ABSTRACT

A new method in the design for an electronic power supply for suppressing signal interference in equipment of an electronic system due to ground current in a ground loop is provided. In a power supply comprising a transformer, a primary circuit, a secondary circuit, and ground conductors, the method is done by connecting the common signal references of secondary side to the ground conductors through a capacitor and an inductor connected in series. The added capacitor is to reject DC and low frequency noise and interference, and the added inductor is to reject high frequency noise and interference. Most noise and interference signals therefore cannot pass through the formed paths. As a result, the degree of signal interference problem is greatly reduced.

10 Claims, 3 Drawing Sheets

METHOD IN THE DESIGN FOR A POWER SUPPLY FOR SUPPRESSING NOISE AND SIGNAL INTERFERENCE IN EQUIPMENT

BACKGROUND OF THE INVENTION

1. Field of the Invention

The present invention relates to the suppression of signal interference in equipment, and more particularly to employing a new grounding technique in a power supply or adaptor to suppress signal interference in equipment due to variable ground current flowing through a ground loop.

2. Description of the Related Art

In computer, electrical and electronic systems, grounding is an important process. According to IEEE, It is defined as a conducting connection, whether intentional or accidental, by which an electric circuit or equipment is connected to the earth, or to some conducting body of relatively large extent in place of the earth. It's used for establishing and maintaining the potential of the earth (or of the conducting body) or approximately that potential, on conductors connected to it, and for conducting ground current to and from the earth (or the conducting body). Besides, earthing is a process of connecting the grounding system to earth and is performed to keep the entire grounding system at earth potential.

A computer and electronic system, which includes a 3-pin power supply or adaptor, a personal computer (PC) or host unit, and a TV or some equipment, is shown in FIG. 1. The internal circuitry of the power supply 100 is simplified, for example, as a DC voltage source 102 at secondary side of the transformer in the power supply 100. "3-pin" is used to describe three conductors to the input of the power supply 100 for wire connections from Line, Neutral and Ground conductors of a power outlet. The three conductors include a line conductor 104, a neutral conductor 106, and a ground conductor 108. The frame ground 118 is the Ground conductor of the power outlet and is connected to earth. The PC 120 as the host unit of the system is simplified as a load resistor R1 and the power is supplied by the power supply 100. The TV 130 is coupled to the PC 120 for signal processing and control, and is also simplified as an input impedance R2 of the TV circuitry. Grounding is the process of interconnecting all of the power supply 100, the PC 120, and the TV 130, and then connecting them to the earth. R3, R4, R5 and R6 represent the total impedances of all cables between the power supply 100, the PC 120, the TV 130, and the frame ground 118. Grounding is achieved through the cables 114 connecting 108 to 118, 110 connecting 108 to 120, 112 connecting 120 to 130, and 116 connecting 130 to the frame ground 118. The DC voltage source 102 supplies a current $I_1$ through a metal line to R1 of the PC 120. The current $I_1$ flows through R1 and the line 110 carries the current $I_1$ back to 108 to complete the voltage source-load circuit. Similarly, there are a line carrying signal to the input impedance R2 of the TV 130 and the line 112 carrying the signal back to the PC 120. $V_{out}$ is the signal voltage of the PC 120 between the two lines that is supplied to the TV 130.

Any closed loop connecting 100, 120 and 130 serving as a signal reference loop is a ground loop (even though ground may not be involved). Practically speaking, there is impedance in all conductive lines, including any ground loop, so there is noise, interference voltages, between various points in any ground loop and in any conductive line when there is current flowing through them. The potential difference between any two points in a ground loop is often called ground voltage shift and is a major source of noise and interference in electronic circuits.

The current in a ground loop, called the ground current, may come from the voltage drop on R4 of the cable 110. The voltage causes a ground current $I_g$ to flow through the loop. The ground current $I_g$ would produce an interference voltage drop at the TV 130 side by flowing through R5, and thereby the voltage $V_{in}$ of 130 across R2 would be about $$V_{in} = V_{out} - I_g * R_5$$

but not be equal to $V_{out}$ of 120. $I_g*R5$ is the interference voltage drop at the TV 130 side. Ground currents, and thus ground voltage shifts, will cause distortion of signal at R2 of 130. Any potential in conducting lines connected to a ground loop with respect to a lower potential in the ground loop can cause ground currents.

Since the load current through R1 of the PC 120 is generally variable, the ground current $I_g$ caused by a voltage across R4 is also variable. Therefore, the interference voltage ($I_g*R5$) is variable. The continuous change of the interference voltage is a significant noise and can interfere with the signals supplied to the TV 130 seriously, resulting in, for example, image quality degradations on the screen of the TV 130.

For the forgoing reasons, there is a need for suppressing the noise and signal interference problem due to ground current in a ground loop. A possible solution to the signal interference problem is using thick lines, for example No.18 AWG (American Wire Gauge) lines, as the signal line 112 in FIG. 1 to increase the protection of signal from noise and interference. Thick lines are not practical and suitable for computer and electronic systems. Another solution is reducing impedance of cable by reducing the lengths of conductors between 100 and 120 or 120 and 130 in the loop. This solution is also difficult to be implemented. As to grounding practice in a power supply, consider a typical power supply 200, shown in FIG. 2, it contains a transformer 202, a primary circuit on the primary side of the transformer 202 connecting to an external AC input voltage source $V_{AC}$, and a secondary circuit on the secondary side of the transformer 202 producing the output voltage $V_{out}$ of the power supply 200. The secondary circuit contains a diode D1 as a rectifier, a filter capacitor C and sometimes has an extra voltage regulator. The output voltage $V_{out}$ is supplied to load equipment such as a PC. Between primary and secondary side, there is a capacitor C3 for reducing EMI level. Common grounding practice is to connect the secondary side 206 to the outside frame ground 210. In order to improve the signal interference problem, the present invention provides a better grounding method.

SUMMARY OF THE INVENTION

As described above, noise or signal interference problem has long been a serious concern in electronic circuits. The main object of the invention is to provide a new grounding technique in the design for an electronic power supply to suppress the signal interference problem in equipment of an electronic system including the power supply.

The traditional grounding practice is to connect the common signal references of the secondary circuits to the outside frame ground. On the contrary, the method of the present invention applied to the power supply is to form conductive paths connecting the common signal references of the primary and secondary circuits to the frame ground through a capacitor and an inductor connected to in series. The addition of a capacitor is to cut the otherwise direct conductive paths being parts of ground loops between the signal references and the ground conductors. The added capacitor is to reject DC or low frequency noise and helps keep electromagnetic interference (EMI) reduction performance because C1 and C2 can be adjusted as C3 of FIG. 2. The added inductor is to reject high frequency noise and interference, together with C2 behaving like a LC filter. Most noise and interference signals cannot pass through the formed conductive paths containing a capacitor and an inductor connected in series. But, the DC impedance of the inductor can't be over 0.1 ohm in order to obey safety regulations. As a result of this grounding technique, the degree of signal interference problem is greatly reduced. Accordingly, the invention provides a good method for suppressing the inevitable signal interference problem in electronic circuits.

DESCRIPTION OF THE PREFERRED EMBODIMENTS

Figure 1:
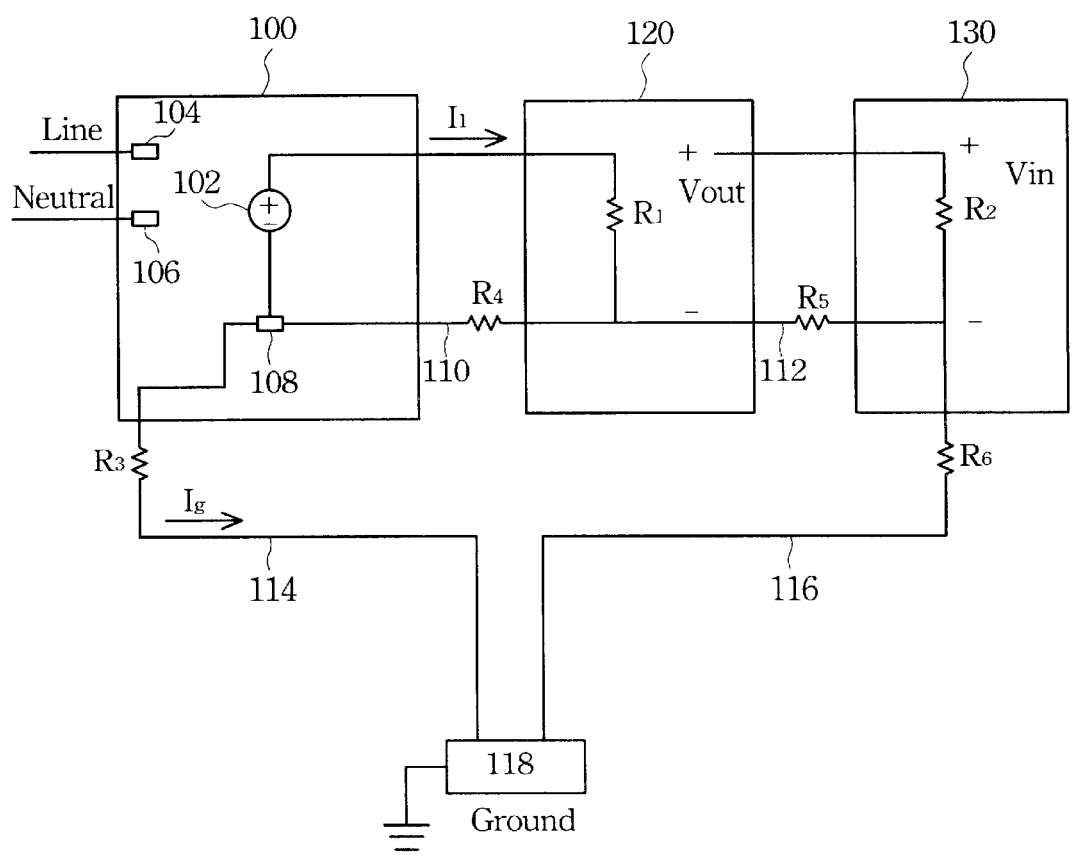
FIG. 1 is a simplified circuit diagram of a computer and electronic system.
Figure 2:
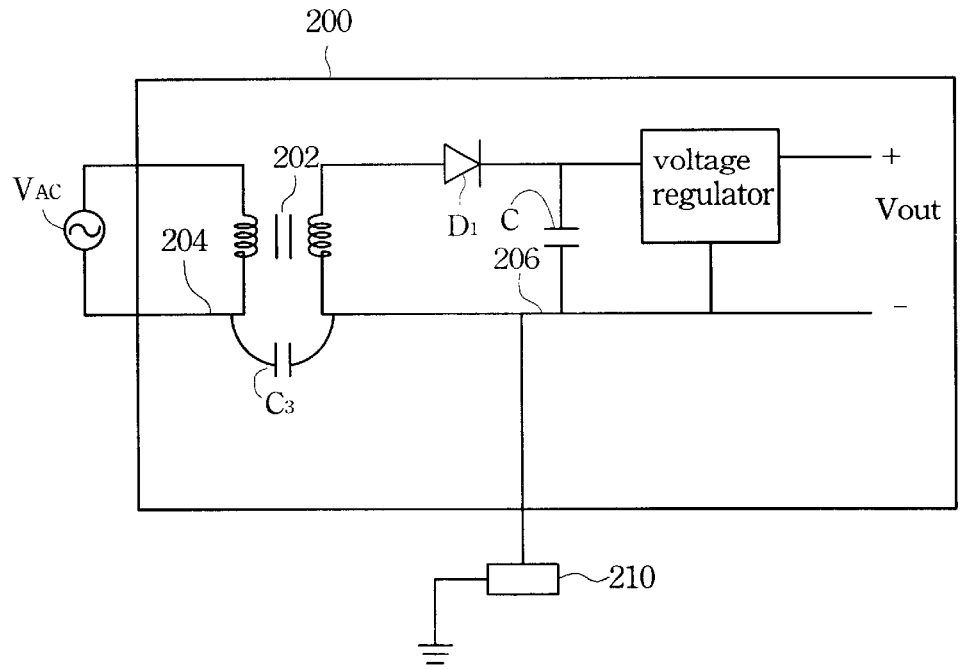
FIG. 2 is a circuit diagram of a typical electronic power supply.
Figure 3:
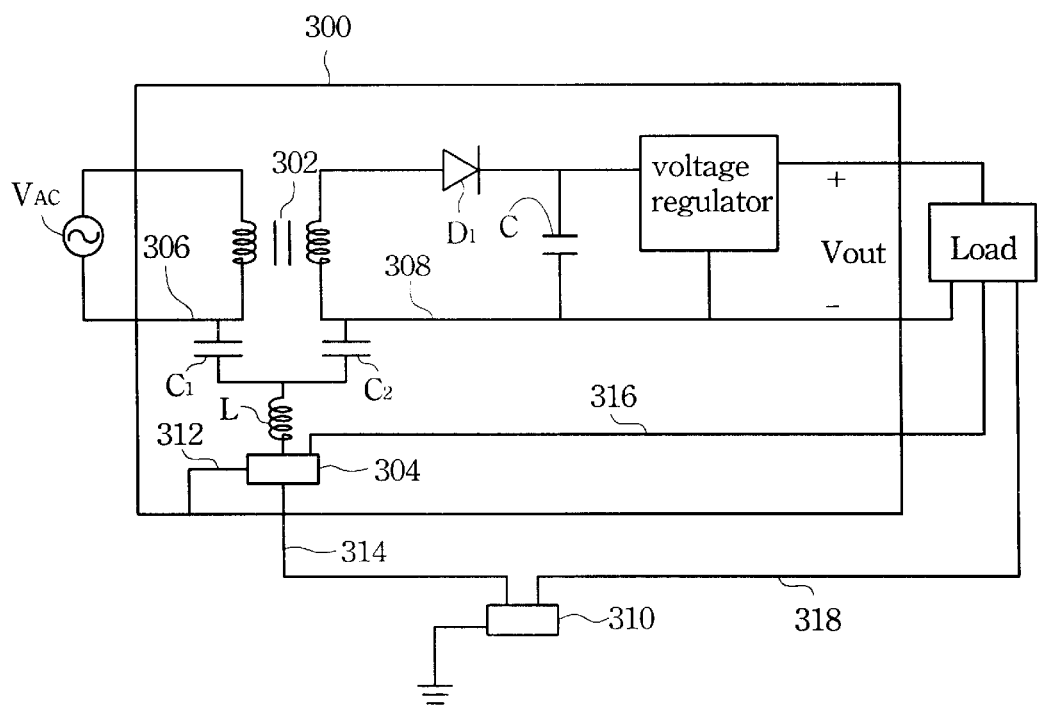
FIG. 3 illustrates one embodiment of the grounding method of this invention in a typical power supply.

One embodiment of the invention is described here. The suppression of signal interference can be achieved through noise control on the part of the power supply or adaptor. Considering a typical power supply 300, shown in FIG. 3, in an electronic system, it contains a transformer 302, a primary circuit on the primary side of the transformer 302 connecting to an external AC input voltage source $V_{AC}$, a secondary circuit on the secondary side of the transformer 302 producing the output voltage $V_{out}$ of the power supply 300, and a ground conductor 304. The load block is a circuit or device for which the power supply is producing the DC voltage and load current. The output voltage $V_{out}$ is supplied to the load. The transformer 302 is used to step up or step down the input AC voltage and to isolate the external AC voltage supply from the secondary circuit.

The secondary circuit contains a diode D1 as a rectifier. This rectifier must be included to convert the AC voltage that varies with time to a pulsating DC voltage. The secondary circuit also contains a capacitor C as a filter used to eliminate the fluctuations in the rectified voltage and produce a relatively smooth DC voltage. The sometimes added voltage regulator is the part of the power supply 300 that accepts a filtered DC voltage and reduces, if not eliminates, the ripple, providing a continuous, smooth DC voltage for a variety of load conditions. The primary and secondary sides 306 and 308 are set at zero voltage, so they are conductively connected to the ground conductor 304 to be set at zero voltage. The ground conductor 304 is sometimes conductively connected to noncurrent-carrying metal parts of the power supply through a line 312 and connected to the load through a wire 316 for equipment grounding, and to be at zero voltage it is connected through a wire 314 to an outside frame ground 310 of the system connected to earth. The load is also connected through a 3-pin power supply or adaptor of second load equipment (not shown) such as TV including a wire 318 to the outside frame ground 310 to complete the ground loop.

Instead of connecting the secondary side 308 directly to the ground conductor 304 through a wire, the new grounding technique is done as follows. A conductive path is formed by connecting the primary side 306 to the ground conductor 304 through a capacitor C1 and an inductor L connected in series. Another conductive path is formed by connecting the secondary side 308 to the ground conductor 304 through a capacitor C2 and the inductor L connected in series. The addition of a capacitor and an inductor connected in series is to cut the otherwise direct conductive paths, being parts of different ground loops, between the signal references and the ground conductor 304. Avoiding direct conductive paths can obstruct noise and grounding current free passing. Interference voltages in the ground loop are reduced if grounding current is cut. The added capacitor C2 is to filter out DC and low frequency noise and help keep electromagnetic interference (EMI) reduction performance. The added inductor L is to reject high frequency noise and interference, together with C2 behaving like a LC filter. As a result of this grounding technique, the degree of signal interference problem is greatly reduced.

Note that the capacitances of the capacitors C1 and C2 chosen are suitable for EMI emission, immunity control of the power supply 300 and the reduction of noise of undesirable frequency. The DC impedance of the inductor L chosen should be less than about 0.1 ohm to comply with safety regulations.

Figure 4:
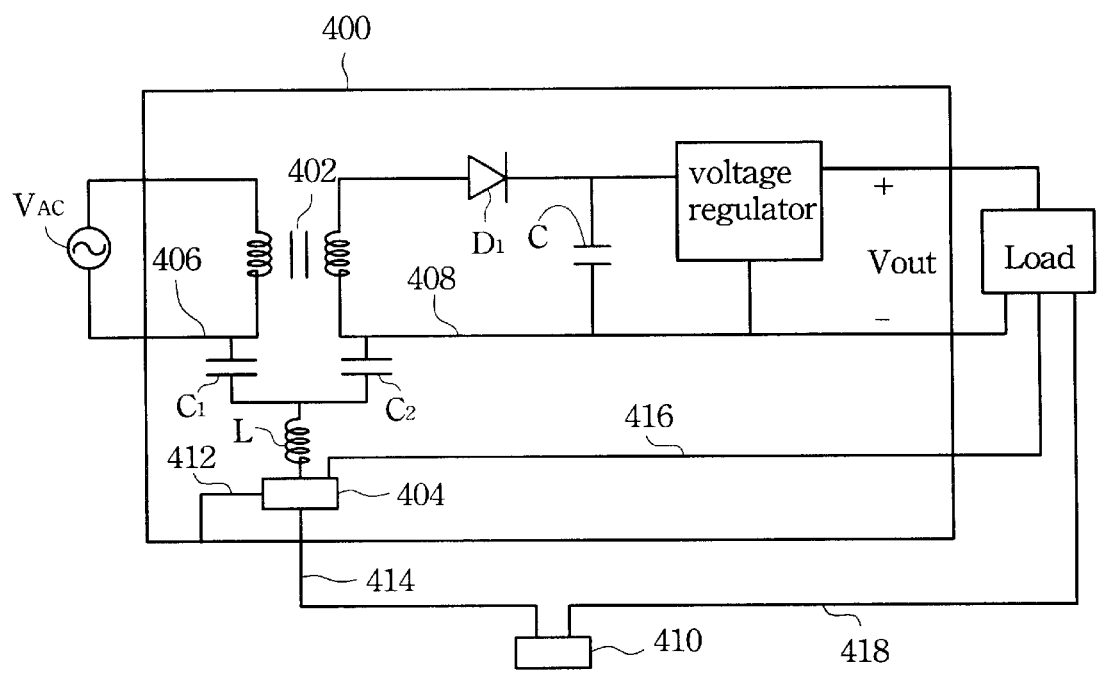
FIG. 4 illustrates another embodiment of the grounding method of this invention in a typical power supply.

With reference to FIG. 4, another embodiment of the invention is described here. The power supply 400 is also a typical power supply in an electronic system. It contains a transformer 402, a primary circuit on the primary side of the transformer 402 connecting to an external AC input voltage source $V_{AC}$, a secondary circuit on the secondary side of the transformer 402 producing the output voltage $V_{out}$ of the power supply 400, and a ground conductor 404. The load block is a circuit or device for which the power supply is producing the DC voltage and load current. The output voltage $V_{out}$ is supplied to the load. The ground conductor 404 is conductively connected to noncurrent-carrying metal parts of the power supply 400 through a wire 412 and connected to the load through a wire 416 for equipment grounding. The ground conductor 404 is also connected to an outside frame ground 410 through a wire 414 and the load is connected to the frame ground 410 through a 3-pin power supply or adaptor of second load equipment (not shown) such as TV including a wire 418 to complete the ground loop. The difference between this power supply 400 and the previous power supply 300 is that the primary and secondary sides 406 and 408 are not set to be at zero voltage, that is, they are not connected to ground. The primary side 406 and secondary side 408 are connected to the ground conductor 404 (ground is not involved) through a capacitor and an inductor connected in series. The frame ground 410 is not connected to the ground (zero voltage) but is at another potential. In this case, the common signal references of the electronic system are not set to be zero voltage, but set to be another potential. The ground loop of the system doesn't involve the ground. The grounding technique of the invention is still applicable to the system.

The above embodiments of the invention are for examples only. It will be apparent to those skilled in the art that various modifications and variations regarding grounding details can be made in the above embodiments of the present invention without departing from the scope or spirit of the invention. Different electronic systems may need different grounding configurations. In view of the foregoing, it is intended that the present invention cover modifications and variations of this invention provided they fall within the scope of the following claims and their equivalents.

What is claimed is:

1. A method for suppressing noise and signal interference in equipment in the design for an electrical power supply comprising a transformer, wherein the transformer includes a primary side and a secondary side, and the power supply comprising a conductor and supplying signals, such as voltages and currents, in a well-regulated form for processing and controlling the flow of electric energy, the method comprising:

forming a first conductive path connecting the primary side of the transformer to the conductor through a first capacitor and an inductor connected in series; and forming a second conductive path connecting the secondary side of the transformer to the conductor through a second capacitor and said inductor connected in series.

2. The method of claim 1, wherein the conductor is for conductively connecting to the earth or some conducting body in place of the earth.

3. The method of claim 1, wherein the conductor serves as a common signal reference at a certain potential.

4. The method of claim 1, wherein the capacitances of the first and second capacitors are chosen for electrical and magnetic emission, immunity control of the power supply and cutting the grounding current loop.

5. The method of claim 1, wherein the DC impedance of the inductor is less than about 0.1 ohm to comply with safety regulations.

6. An electrical power supply for processing and controlling the flow of electric energy by supplying signals, such as voltages and currents, in a well-regulated form required by the end user, the power supply comprising:

a transformer comprising a primary side and a secondary side;

a conductor;

a first conductive path connecting the primary side to the conductor, comprising a first capacitor and an inductor connected in series; and a second conductive path connecting the secondary side to the conductor, comprising a second capacitor and said inductor connected in series.

7. The electrical power supply of claim 6, wherein the conductor is for conductively connecting to the earth or some conducting body in place of the earth.

8. The electrical power supply of claim 6, wherein the conductor serves as a common signal reference at a certain potential.

9. The electrical power supply of claim 6, wherein the capacitances of the first and second capacitors are chosen for electrical and magnetic emission, immunity control of the power supply and cutting the grounding current loop.

10. The electrical power supply of claim 6, wherein the DC impedance of the inductor is less than about 0.1 ohm to comply with safety regulations.

* * * * *